United States Patent [19]
Aoyama

[11] Patent Number: 5,372,280
[45] Date of Patent: Dec. 13, 1994

[54] CHUCKING TYPE PARTS FEEDING APPARATUS

[76] Inventor: Yoshitaka Aoyama, 20-11, Makitsukadai 2-cho, Sakai-shi, Osaka 590-01, Japan

[21] Appl. No.: 113,073

[22] Filed: Aug. 30, 1993

[30] Foreign Application Priority Data

Aug. 29, 1992 [JP] Japan .................. 4-272243
Sep. 19, 1992 [JP] Japan .................. 4-293667

[51] Int. Cl.⁵ .................................... B65G 59/00
[52] U.S. Cl. ............................ 221/278; 81/57.37; 227/113
[58] Field of Search .......... 221/13, 224, 236, 238, 221/258, 262, 278, 290, 293, 294, 239; 227/2, 1, 135, 113, 107; 81/57.37, 430, 431; 29/809, 810

[56] References Cited

U.S. PATENT DOCUMENTS

| | | | |
|---|---|---|---|
| 1,975,468 | 10/1934 | MacDonald | 227/135 |
| 2,953,049 | 9/1960 | Vilmerding | 81/57.37 |
| 3,098,576 | 7/1963 | Steward | 227/2 |
| 3,233,752 | 2/1966 | Lagler et al. | 269/55 |
| 3,275,191 | 9/1966 | MacDonald | 221/290 |
| 3,971,116 | 7/1976 | Goodsmith et al. | 227/2 |
| 4,416,172 | 11/1983 | Medinger | 227/113 |
| 4,815,343 | 3/1989 | Sofinowski | 81/57.37 |
| 5,009,354 | 4/1991 | Aquila et al. | 227/2 |

FOREIGN PATENT DOCUMENTS

| | | |
|---|---|---|
| 4012918 | 10/1990 | Germany . |
| 62-259733 | 11/1987 | Japan . |
| 2198916 | 8/1990 | Japan . |
| 4093192 | 3/1992 | Japan . |
| 4122531 | 4/1992 | Japan . |
| 2244224 | 11/1991 | United Kingdom . |

Primary Examiner—Kenneth W. Noland
Attorney, Agent, or Firm—Pollock, Vande Sande & Priddy

[57] ABSTRACT

A chucking-type parts-feeding apparatus comprises a device for chucking an individual part, which is disposed adjacent an end of a parts-feeding passageway, and a device connected with the chucking device for shifting the individual part held in the chucking device towards a predetermined location apart from the parts-feeding passageway. The apparatus further comprises either a device connected with the chucking device for shifting the individual part held in the chucking device in the direction in which the part comes out of the parts-feeding passageway or an opening formed in the parts-feeding passageway for allowing the part to pass through the opening as the chucking device is moved towards the predetermined location.

4 Claims, 3 Drawing Sheets

CHUCKING TYPE PARTS FEEDING APPARATUS

BACKGROUND OF THE INVENTION

The present invention relates to a chucking-type parts-feeding apparatus which delivers individual parts to a chucking device held on standby mode for holding each part before eventually feeding these parts to an objective position.

To the best of the inventor's knowledge, there is no prior art exactly corresponding to the chucking-type parts-feeding apparatus proposed by the present invention. However, actually, there are a variety of parts-feeding systems for delivering designated parts to an objective location by operating a chucking device for grasping them.

Generally, any of those prior art devices causes a chucking device to gain access to designated parts or causes those parts to be delivered to the chucking device, and therefore, it generates problems in the relative positional relationship between the delivered parts and the chucking device because of much difficulty to correctly determine this relationship. Furthermore, any of those prior art device also generate critical problems when the chucking device inclines or stands upright because those parts received by the chucking device are subject to displacement as a result of inclined posture of the parts themselves, thus making it quite difficult to correctly chuck them at an upright position.

SUMMARY OF THE INVENTION

Therefore, the invention has been achieved to fully solve those technical problems incidental to conventional parts feeding systems. The improved chucking-type parts-feeding apparatus according to of the invention provides a parts-chucking device at a predetermined position corresponding to an end of a parts-feeding passageway, wherein a first drive means is provided in combination with the chucking device in order to shift individual parts held in the chucking device in the direction to get out of the parts-feeding passageway, and in addition, a second drive means is also provided in order to shift individual parts in the direction apart from the parts-feeding passageway. Each part arriving at an end of the parts-feeding passageway enters into the chucking device, where the chucked part is pushed out of the passageway by the first drive means, and then the extruded part is pushed farther from the passageway by the second drive means, and finally, the extruded part is transferred to an objective location in the chucked condition.

According to the invention, a parts-chucking device is disposed at a predetermined position corresponding to an end of the parts-feeding passageway, and therefore, an individual part arriving at an end of the passageway is automatically positioned inside of the chucking device. Consequently, the relative-positional relationship between an individual part and the chucking device can easily be determined without discretely providing a special high-precision measuring means.

Since a performance locus of each transferable part can be established by first and second drive means, individual parts can respectively be delivered to an objective location very smoothly.

The chucking-type parts-feeding apparatus according to the invention provides a parts-chucking device at a predetermined position corresponding to an end of a parts-feeding passageway, wherein a drive means is provided in order to transfer an individual part held in the chucking device farther from the passageway, and in addition, an outlet port is formed in the parts-feeding passageway to carry the part farther from the passageway. Once the part in the passageway is chucked, the chucked part is delivered to the predetermined objective location via the outlet port.

Provision of a single drive means and an outlet port results in the simplified shifting locus of individual parts, thus effectively saving operating time. The outlet port can also be used for ejecting all the remaining parts from the feeding passageway.

The chucking-type parts-feeding apparatus according to the invention provides a parts-feeding passageway having an end being formed to cause partial domain of an individual part to protrude from the passageway in order to feed the protruded part of the individual part into the chucking device.

Since partial domain of an individual part protrudes from an end of the parts-feeding passageway, by correctly matching the chucking device with an end of the passageway, the parts-feeding apparatus materializes a positional relationship in order that the individual parts can instantaneously be accommodated in the chucking device, thus effectively facilitating chucking operation.

The parts-feeding apparatus according to the invention incorporates an extendable and retractable detection rod for detecting presence or absence of an individual part in the chucking device as well as for thrusting the individual part into the chucking device. Concretely. The detection rod checks and confirms presence or absence of an individual part in the chucking device and simultaneously sets the parts to a predetermined position.

The detection rod detects whether an individual part is at an end domain of the parts-feeding passageway, or not. Simultaneously, the detection rod sets the part to a predetermined position, thus enabling the apparatus to perform a highly reliable parts feeding operation.

The parts-feeding apparatus according to claim 5 of the invention incorporates a sensor for checking and confirming presence or absence of an individual part in the chucking device at a predetermined position thereof. The sensor checks to see if a designated individual part is correctly set to a predetermined position while the chucking device shifts itself.

The parts-feeding apparatus according the invention provides an air-jetting port at partial domain of the chucking device or at a specific domain of the apparatus integrally moving with the chucking device. This air-jetting system blows off impurities deposited on a predetermined location by directing air against it so that the objective location can be fully cleaned.

The parts-feeding apparatus checks and confirms presence or absence of a designated individual part by means of a sensor and fully removes impurities from the interior of the apparatus by directing air against it, thus effectively promoting more reliable operating capability.

The parts-feeding apparatus according to the invention obliquely or vertically disposes a parts-feeding passageway and installs a parts-chucking device at a position corresponding to an end of the parts-feeding passageway. The chucking device incorporates a holding means for preventing the chucked part from being displaced due to inclined posture of the parts-feeding passageway. An individual part fed into the chucking device is held with the least displacement by the holding means and placed at a correct position when the chucking device is operative.

According to the parts-feeding apparatus offered by the invention, since the parts-feeding passageway is obliquely or vertically disposed, the chucking device stands on a posture corresponding to that of the parts-feeding passageway. However, since, an individual part fed into the chucking device is prevented from being displaced by virtue of the provision of the holding means, the individual part is automatically set to a correct position inside of the chucking device. Consequently, the parts-feeding apparatus can easily determine a relative-positional relationship between the individual part and the chucking device without discretely installing a special high-precision measuring means.

The parts-feeding apparatus according to the invention has a protruded holding means so that the individual part can be prevented from being displaced by virtue of the provision of the projection.

The parts-feeding apparatus according to the invention has a holding means comprising a magnet so that the individual part can be prevented from being displaced by virtue of the magnetic attraction.

BRIEF DESCRIPTION THE DRAWINGS

DESCRIPTION OF THE PREFERRED EMBODIMENTS

Figure 7:
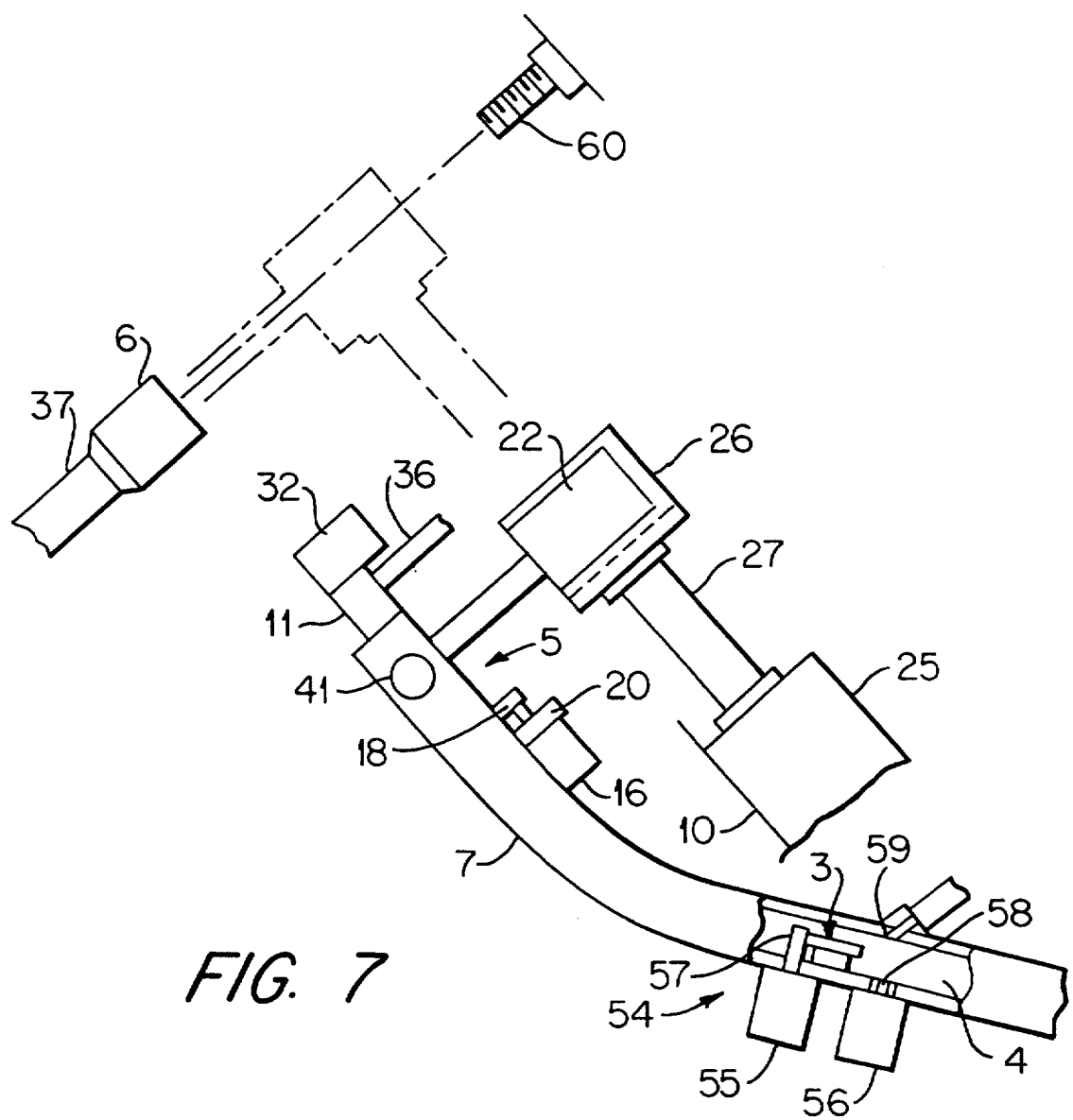
FIG. 7 is a lateral view designating the state in which the whole feeding apparatus is obliquely disposed.

Referring now to FIGS. 1 through 4, structural detail of the parts-feeding apparatus of the invention is described below. As shown in FIG. 7, the whole of the partsfeeding apparatus related to the invention is obliquely disposed by way of facing upward. However, for better understanding of the structure, except for the one shown in FIG. 7, all the parts-feeding apparatuses in the drawings are illustrated without being tilted. It should be understood, however, that the scope of the invention is also applicable to such a case in which the parts-feeding apparatus is vertically disposed and an individual part deviates from the predetermined position.

Such an individual part dealt by the parts-feeding apparatus of the invention solely comprises a nut 3 consisting of a hexagonal main body 1 and a circular flange 2. Using a chucking device 5, an individual nut 3 is drawn out of a parts-feeding passageway 4 before eventually being delivered to a box wrench 6 of a nutrunner. Structurally, the parts-feeding passageway 4 comprises a rectangular-sectional parts-feeding tube 7. A cut-off domain 8 is formed at an end of the feeding tube 7 facing the chucking device 5. A predetermined depth is provided for the feeding passage 4 in order that the circular flange 2 can protrude from an end of the feeding passageway 4. The parts-feeding tube 7 is secured to a stationary member 10 via a bracket 9.

Functionally, the chucking device 5 holds an individual part (the nut 3) by chucking it. Thus, it is substantially equivalent to any conventional chucking device. Conventionally, there are two types of chucking devices including the one that chucks an individual part with a pair of jaws and the other that chucks an individual part between a jaw and a stationary reference surface. In this embodiment, the latter one is used.

Figure 4:
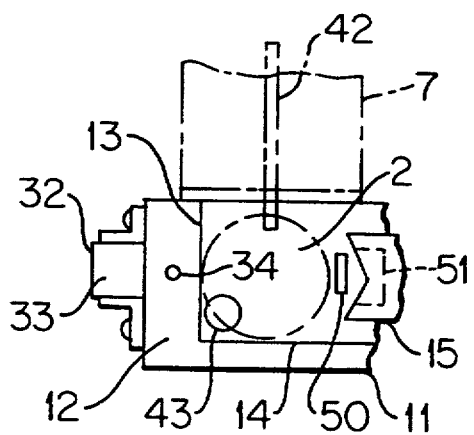
FIG. 4 is an inverted plan of the base plate 11.

A base plate 11 has a positional relationship in order that it can cover an end domain of the parts-feeding passageway 4. A projected member 12 secured to the periphery of the base plate 11 forms reference surfaces 13 and 14. FIG. 4 illustrates an inverted plan of the base plate 11, in which the reference surfaces 13 and 14 are discernibly shown. A pressuring member 15 having a >-shaped end is installed by way of facing the reference surface 13. The pressuring member 15 is driven to the left and to the right by a pneumatic cylinder 16. A lengthy through-hole 17 is formed in the base plate 11 to enable a supporting shaft 18 secured to the pressuring member 15 to penetrate the lengthy hole 17, and yet, a piston rod 19 of the pneumatic cylinder 16 is coupled with the supporting shaft 18. The pneumatic cylinder 16 is secured to a stationary plate 20 integrated with the base plate 11.

Figure 1:
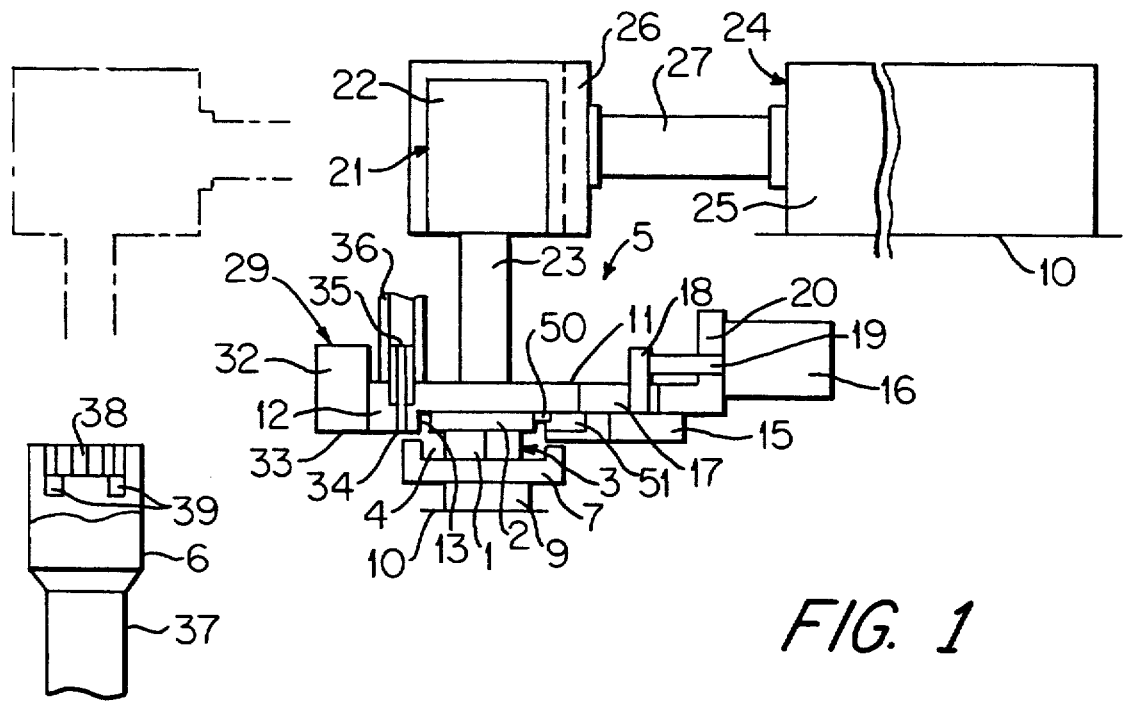
FIG. 1 is a vertical sectional view of the partsfeeding apparatus according to an embodiment of the invention.

In the case of oblique posture of the parts-feeding apparatus shown in FIG. 7, since the base plate 11 shown in FIG. 1 is obliquely disposed with the declined right side, in order to prevent the nut 3 from being displaced in the declining direction, a projection 50 is secured to the bottom surface of the base plate 11. In order to prevent the projection 50 from interfering with the forward and backward strokes of the pressuring member 15, a groove 51 is formed in the pressuring member 15. In order to permit the nut 3 to get out of the parts-feeding passageway 4 in the upward direction shown in FIG. 1, the whole of the chucking device 5 is transferable. To materialize this, a first drive means 21 is built in the chucking device 5. The first drive means 21 is substantiated by a pneumatic cylinder 22 having a piston rod 23 being coupled with the top surface of the base plate 11. A second drive means 24 is provided in the direction of causing the nut 3 to leave the parts-feeding passageway 4, in other words, in order to shift both the chucking device 5 and the pneumatic cylinder 22 to the left in FIG. 1. The second drive means 24 includes a pneumatic cylinder 25 for example, which is solidly secured to the stationary member 10. An end of an inverse L-shaped bracket 26 is engaged with a piston rod 27 of the pneumatic cylinder 25. The pneumatic cylinder 22 is secured to the other end of the bracket 26 with a bolt 28.

A sensor 29 is secured to the left end of the base plate 11 by means of a bracket 30 and a bolt 31. The sensor 29 detects whether the designated nut 3 is held in the box wrench 6, or not. Either a phototransistor, or a photoelectric tube, or a contactless switch, may be used for the sensor 29. In the embodiment shown in FIG. 4, a contactless switch 32 is introduced, which has a prone-faced photosensitive surface 33. An air-jett port 34 is formed in the base plate 11. A hose 36 is connected to a joint tube 35.

A shaft 37 of the box wrench 6 is rotated by a motor (not shown) which is movable back and forth by a pneumatic cylinder. In order to precisely fix the hexagonal main body 1, a dodecagonal hole 38 may be formed in -the box wrench 6 rather than forming a hexagonal hole 38 for the sake of smoother engagement with the hexagonal main body 1. A magnet 39 is built in the inmost domain of the engaging hole 38. Air jetted out of the air-jetting port 34 blows off impurities deposited inside of the engaging hole 38 including debris of plated metal stripped off from nuts or iron debris or the like.

A bracket 40 is secured to a curved domain of the parts-feeding tube 7 via welding. A pneumatic cylinder 41 is secured to the bracket 40. A piston rod 42 of the pneumatic cylinder 41 penetrates into the parts-feeding tube 7 so that it functions as a detection rod, and then, the detection rod 42 pushes the hexagonal main body 1 or the circular flange 2 as indicated by a double-dot chained line shown in FIG. 4 to subsequently cause the circular flange 2 to hit against the reference surface 14. By execution of these processes, the detection rod 42 checks to see if the designated nut 3 has already arrived at the interior of the chucking device 5, or not. If the nut 3 were not yet in the chucking device 5, then the detection rod 42 prohibits the parts-feeding apparatus to execute any further process.

As shown in FIG. 4, a magnet 43 may be built in the base plate 11 as required in order to facilitate entry of the nut 3. Note that illustration of pneumatic hoses connected to respective cylinders and electric cables connected to contactless switches is deleted here. Those operations to be described hereinbelow can easily be executed by applying conventional sequence control circuits, electromagnetic air control valves, and switches for detecting stroke amount of pneumatic cylinders, and therefore, detailed description of these operations is also deleted here.

Figure 2:
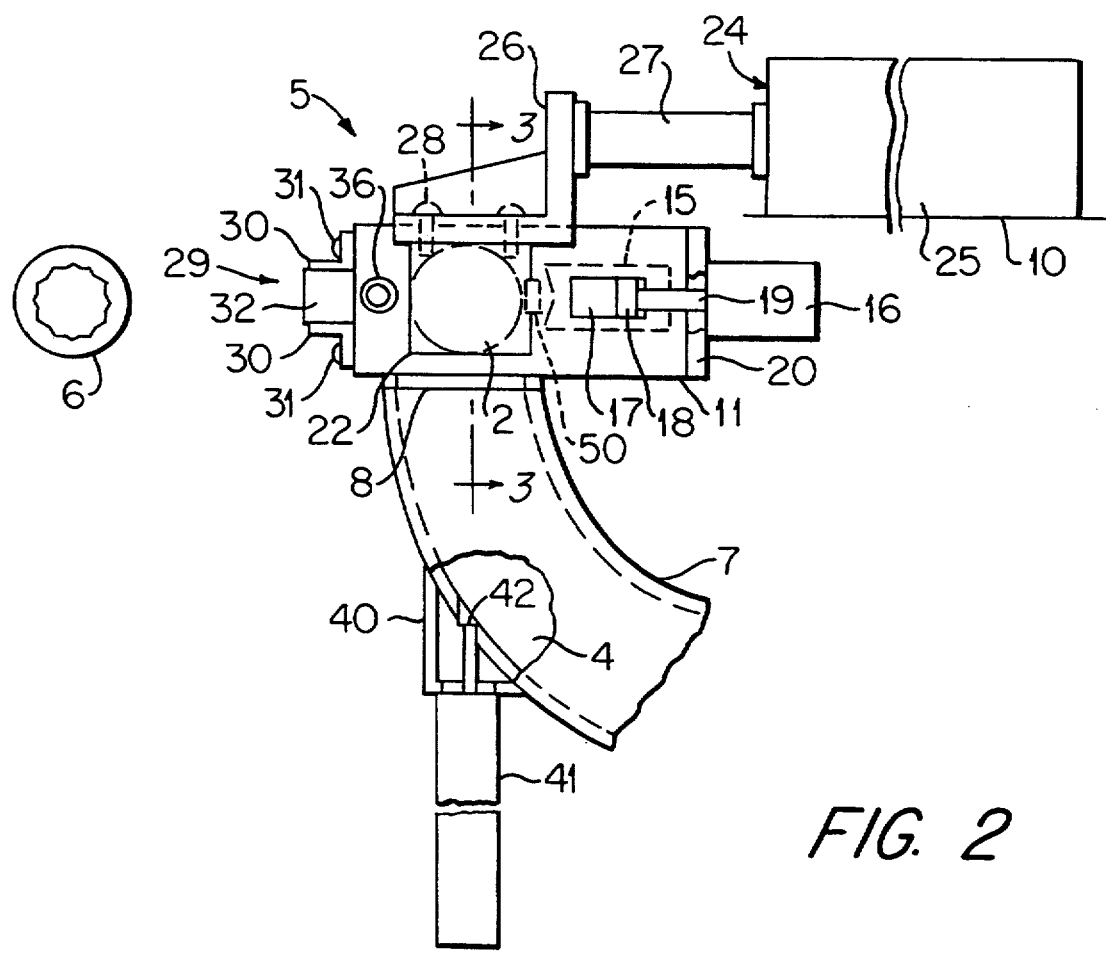
FIG. 2 is a plan of the parts-feeding apparatus shown in FIG. 1.
Figure 3:
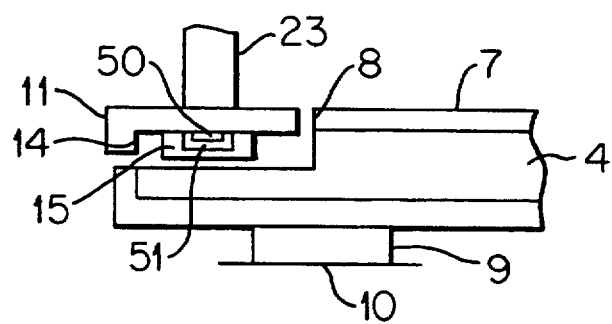
FIG. 3 is a Sectional view of the parts-feeding apparatus taken on line 3 through 3 of FIG. 2.

Regarding operations of the parts-feeding apparatus according to the above embodiments, FIGS. 1 and 2 illustrate the state in which the nut 3 moves to an end of the parts-feeding tube 7, whereas the circular flange 2 is positioned between the reference surface 13 and the projection 50. The projection 50 prevents the nut 3 from being displaced to the right by the inclined posture of the parts-feeding tube 7. When the detection rod 42 thrusts the hexagonal main body 1, the circular flange 2 hits against the reference surface 14. Then, the pressuring member 15 is shifted to the left by the pneumatic cylinder 16 to cause the circular flange 2 to be nipped between the reference surface 13 and the pressuring member 15. This completes the whole operation of the chucking device 5. Next, the pneumatic cylinder 22 is operated to permit the nut 3 to get out of the parts-feeding passageway 4 in the upward direction shown in FIG. 1. Next, by virtue of the operation of the pneumatic cylinder 25, the nut 3 leaves the parts-feeding passageway 4 to the left in FIG. 1. The nut 3 stops its own movement to the left at a position coaxial with the box wrench 6, and then, the nut 3 is brought down by the pneumatic cylinder 22 so that the hexagonal main body 1 can be inserted into the engaging hole 38. The circular flange 2 is held as of the nipped condition, in other words, in the braked condition while the hexagonal main body 1 is on the way of being inserted into the engaging hole 38. Therefore, the nut 3 is free to rotate with the box wrench 6. When the insertion of the main body 1 into the engaging hole 38 starts off, pressuring force of the pressuring member 15 is attenuated while receiving absorptive force of the magnet 39. If the nut 3 still remains in the engaging hole 38 while the chucking device 5 shifts to the left, the contactless switch 32 detects presence of the nut 3 to cause the chucking device 5 to immediately return to the initial position to operate the box wrench 6 in order to bring the nut 3 to the objective position before eventually completing fastening of the nut 3 with the corresponding bolt (not shown). On the other hand, if the nut 3 were not present in the box wrench 6 while the chucking device 5 shifts to the left, then, as mentioned earlier, the nut 3 is inserted into the engaging hole 38. Then, the contactless switch 32 detects that the nut 3 is actually present in the engaging hole 38 while the chucking device 5 returns to the right to permit the box wrench 6 to generate a signal to initiate ensuing operation to proceed. On the way of passing by the engaging hole 38, the air jet port 34 blows out impurities from the engaging hole 38.

The above embodiment shown in FIGS. 1 through 4 installs the first drive means for shifting the chucking device 5 upwards to enable the nut 3 to get out of the parts-feeding passageway 4. The embodiment shown in FIG. 5 deletes the process for lifting the chucking device 5. An outlet aperture 44 is formed at an end of the parts-feeding passageway 4. A bracket 45 is secured to the base plate 11 via welding. The piston rod 27 is connected to the bracket 45. Therefore, the embodiment shown in FIG. 5 incorporates a single drive means designated by the reference numeral 24 (see FIG. 1).

Figure 5:
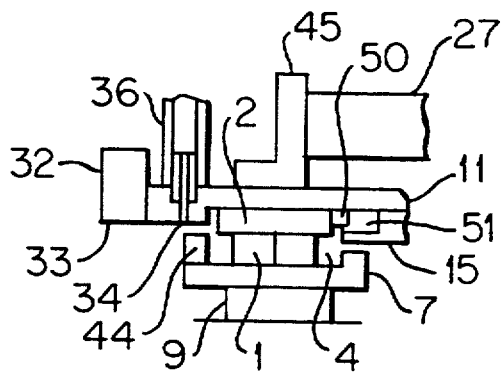
FIG. 5 is a partial vertical-sectional view of the parts-feeding apparatus according to another embodiment of the invention.

When the piston rod 27 proceeds to the left from the state shown in FIG. 5, the hexagonal main body 1 of the nut 3 passes by the outlet aperture 44 before being delivered to the objective position.

Figure 6:
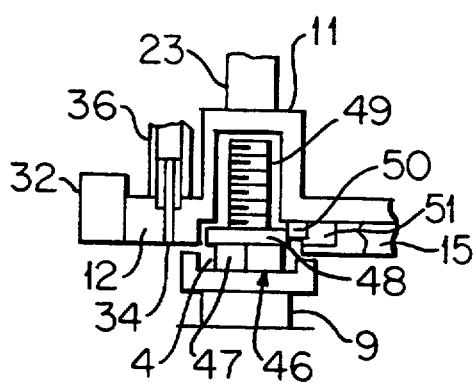
FIG. 6 is a partial vertical-sectional view of the parts-feeding apparatus according to another embodiment of the invention.

The embodiment shown in FIG. 6 deals with a bolt 46 comprising a hexagonal head 47, a flange 48, and a shaft 49. As shown in FIG. 6, the base plate 11 has a vessel-like form corresponding to the shape of the shaft 49. As was done for the above embodiment, the pressuring member 15 chucks the flange 48. Alternatively, the pressuring member 15 may pressure the shaft 49.

Figure 8:
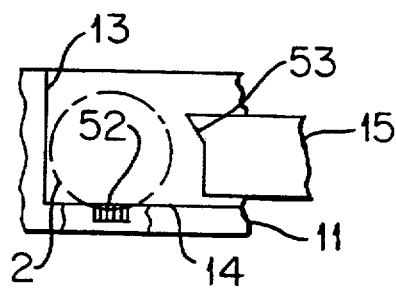
FIG. 8 is a partial plan of the parts-feeding apparatus according to another embodiment of the invention.
Figure 9:
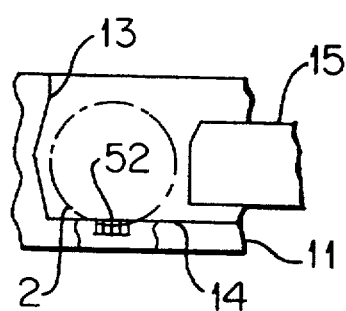
FIG. 9 is a partial plan of the parts-feeding apparatus according to a still further embodiment of the invention.

In the same way as that of FIG. 4, FIGS. 8 and 9 respectively illustrate other embodiments. The embodiment shown in FIG. 8 installs a magnet 52 inside of the reference surface wall 14. A circular arc is formed at the tip end of the upper surface of the pressuring member 15.

Availing itself of absorptive force of the magnet 52, the flange 2 is prevented from being displaced by the incline. When the pressurizing member 15 shifts to the left, the circular arc 53 correctly matches the external form of the flange 2, and then, the flange 2 is positioned while being chucked between the reference surface 13 and the circular arc 53.

Like the embodiment shown in FIG. 8, the embodiment shown in FIG. 9 incorporates a magnet 52. As shown in FIG. 9, the reference surface 13 has a <-shape. When the pressurizing member 15 shifts to the left, the flange 2 is positioned at the <-shaped domain.

FIG. 7 illustrates a control device 54 used for discretely delivering an individual nut. A pair of pneumatic cylinders 55 and 56 are secured to a parts-feeding tube 7. Each nut is externally delivered by causing a pair of piston rods 57 and 58 of those pneumatic cylinders 55 and 56 to alternately extend and retract themselves. While the piston rod 57 extends and the other piston rod 58 retracts, an air jet against the nut so that it can be led into the chucking device. Air jet port 59 is formed in the parts-feeding tube 7. The parts-feeding tube 7 can be cleaned as required after fully retracting those piston rods 57 and 58. The reference numeral 60 shown in FIG. 7 designates a bolt held at the objective position.

Figure 10:
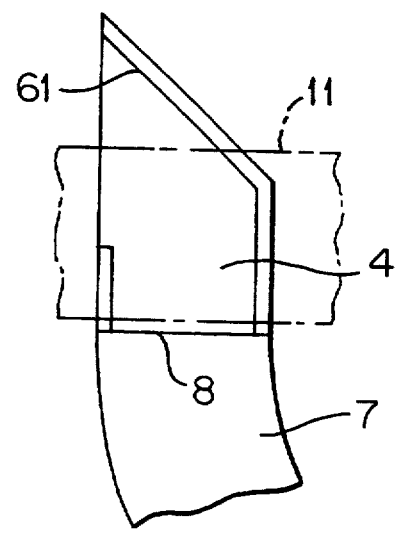
FIG. 10 is a partial plan of a varied example of an end of the parts-feeding passageway related to the invention.

FIG. 10 illustrates a varied example of an end of the parts-feeding tube 7. In consideration of a need for ejecting a nut remaining in the parts-feeding tube 7 by an air jet, an inclined wall 61 is formed on the lateral surface of the parts-feeding passageway 4. Therefore, when directing an air jet against the remaining nut after shifting the base plate 11 (shown by a double-dot chained line) in the direction vertical to the paper surface of FIG. 10, the nut is guided along the inclined wall 61 before smoothly being ejected out of the parts-feeding tube 7.

The above description has referred to those embodiments appropriate for the case shown in FIG. 7 in which the whole of the parts-feeding apparatus is obliquely disposed. However, there is no fear of displacing the internal parts as in the example shown in FIG. 1 illustrating the vertically disposed parts-feeding apparatus, and therefore, the parts-feeding apparatus may dispense with those holding means 50 and 52 used for preventing the parts from being deviated.

What is claimed is:

1. A chucking-type parts-feeding apparatus comprising:

a device for chucking an individual part, which is disposed at a predetermined position corresponding to an end of a parts-feeding passageway;

a first drive means combined with said chucking device for shifting an individual part held in said chucking device in a first direction separating the part from said parts-feeding passageway;

a second drive means for shifting said individual part held in said chucking device in a second direction removed from said parts-feeding passageway; and an air jet connected to said chucking device and integrally transferable therewith to a position confronting an upward opening of a box wrench for blowing air into the opening and cleaning off impurities prior to the part being received by the box wrench opening.

2. The chucking-type parts-feeding apparatus as defined in claim 1, wherein a delivery end of said parts-feeding passageway is sufficiently shallow so that said individual part can protrude from said parts-feeding passageway.

3. The chucking-type parts-feeding apparatus as defined in claim 1 further comprising an extendable and retractable detection rod for checking and confirming presence or absence of an individual part in said chucking device and pushing said part into said chucking device upon its confirmed presence.

4. The chucking-type parts-feeding apparatus as defined in claim 1, further comprising a sensor secured to part of said chucking device in order to check and confirm presence or absence of an individual part in said chucking device.

* * * * *